US007690409B2

(12) United States Patent
Pengg

(10) Patent No.: US 7,690,409 B2
(45) Date of Patent: Apr. 6, 2010

(54) CONNECTING AND GUIDE ELEMENT FOR A TIRE CHAIN

(75) Inventor: Agyd Pengg, Klagenfurt (AT)

(73) Assignee: Pewag Austria GmbH, Graz (AT)

( * ) Notice: Subject to any disclaimer, the term of this patent is extended or adjusted under 35 U.S.C. 154(b) by 208 days.

(21) Appl. No.: 11/752,979

(22) Filed: May 24, 2007

(65) Prior Publication Data

US 2007/0277917 A1 Dec. 6, 2007

(30) Foreign Application Priority Data

May 31, 2006 (AT) .............................. A 941/2006

(51) Int. Cl.
B60C 27/10 (2006.01)
(52) U.S. Cl. .................. 152/219; 152/217; 152/231
(58) Field of Classification Search ................ 152/170, 152/175, 185, 213 R, 217, 218, 219, 221, 152/231, 233, 239, 243, 213 A; 59/78, 82, 59/84, 87, 90
See application file for complete search history.

(56) References Cited

U.S. PATENT DOCUMENTS

| 1,445,694 | A | * | 2/1923 | Kotarski | 152/219 |
| 1,486,993 | A | * | 3/1924 | Stolpe | 152/242 |
| 1,768,153 | A | * | 6/1930 | Romain | 152/213 A |
| 2,976,902 | A | * | 3/1961 | St Pierre | 152/217 |
| 4,215,733 | A | * | 8/1980 | Rieger et al. | 152/171 |
| 4,390,053 | A | * | 6/1983 | Rieger et al. | 152/213 A |
| 4,416,319 | A | * | 11/1983 | Hofmann | 152/213 R |
| 4,679,608 | A | * | 7/1987 | Jeindl | 152/213 A |
| 4,862,935 | A | * | 9/1989 | Goto | 152/213 A |
| 5,236,025 | A | * | 8/1993 | Maresh | 152/219 |
| 6,089,291 | A | * | 7/2000 | Romolo et al. | 152/231 |
| 6,871,486 | B2 | * | 3/2005 | Moehnke et al. | 59/78 |
| 6,889,734 | B2 | * | 5/2005 | Deger et al. | 152/213 A |

FOREIGN PATENT DOCUMENTS

| CH | 677215 A5 | * | 4/1991 |
| DE | 26 51 162 | | 5/1978 |
| DE | 3411977 A1 | * | 10/1984 |
| DE | 35 26 027 | | 1/1987 |
| DE | 101 05 410 | | 7/2002 |
| DE | 20 2004 010577 | | 9/2004 |
| EP | 108154 A1 | * | 5/1984 |
| EP | 1 355 792 B1 | | 10/2003 |
| FR | 2691775 A1 | * | 12/1993 |

OTHER PUBLICATIONS

European Search Report for European Application No. EP 07 45 0074 mailed on Sep. 3, 2007.

* cited by examiner

Primary Examiner—Russell D Stormer
(74) Attorney, Agent, or Firm—RatnerPrestia

(57) ABSTRACT

A connecting and guide element for connecting a side mesh of a tire chain to a side tensioning strand and for accommodating an excess length of the tensioning strand, wherein the element has two eyes, which lie in a first plane for accommodating tensioning strand and excess length, and two eyes lying in a second plane running essentially orthogonally to the first plane for accommodating connecting links to the side mesh, and a tire chain in which the side mesh is connected by means of a side tensioning strand and a plurality of connecting and guide elements, and an excess length of the tensioning strand can be accommodated in one of the eyes of the elements.

11 Claims, 4 Drawing Sheets

CONNECTING AND GUIDE ELEMENT FOR A TIRE CHAIN

CROSS-REFERENCE TO RELATED APPLICATION

The present application claims priority from Austrian Patent Application A 941/2006, filed on May 31, 2006.

FIELD OF THE INVENTION

The invention relates to a connecting and guide element for a tire chain for connecting a side mesh of the tire chain to a side tensioning strand and for accommodating an excess length of the tensioning chain, wherein the element has at least two eyes for accommodating a tensioning strand, excess length and connecting links to the side mesh, and wherein the two eyes for the tensioning strand and excess length lie in a common plane.

BACKGROUND OF THE INVENTION

An element of this kind known from EP 1 355 792 B1 has only two eyes, of which one eye is made larger so that it can not only accommodate an end link of the side mesh but also provide space for pulling through an excess length of a tensioning chain.

In the case of a chain with elements of this kind, a severe skewing of the elements can be produced when tensioning. This effect is further amplified when, as specified in the document, the excess length is accommodated in the eye which is positioned radially further to the outside and the tensioning chain is accommodated in the eye which is positioned further to the inside. Such a skewing leads in turn to increased effort for aligning the elements during fitting. A further problem lies in the fact that, due to the central fitting of a welded ring of the tire chain in the outer eye, the tensioning chain moves further towards the center of the wheel than is necessary for fixing the chain.

SUMMARY OF THE INVENTION

An aspect of the invention lies in eliminating the stated disadvantages with the help of a new connecting and guide element and/or with an appropriate tire chain.

This is achieved with a connecting and guide element of the type mentioned in the introduction in which, according to an exemplary embodiment of the invention, in addition to the two eyes, which lie in a first plane for accommodating the tensioning strand and its excess length, two eyes lying in a second plane running essentially orthogonally to the first plane are provided for accommodating the connecting links to the side mesh.

Thanks to the arrangement of the two outer eyes, a skewing of the element is reduced, these two eyes also lead to a reduction in the overall installed height in the radial direction.

A favorable variation of the element also with regard to easy manufacturing is distinguished by the fact that it has two plate-like sections, namely a larger inner section with the eyes which lie in the first plane, and a smaller outer section with the eyes which lie in the second plane running essentially orthogonally to the first plane.

Furthermore, it is expedient when the eyes lying in the first plane are designed to be essentially circular, not least because in this case the eyes can also be formed by drilling. For this reason, it can also be advisable if the eyes lying in the second plane are designed to be essentially circular.

If the thickness of the plate-like inner section reduces radially towards the inside, material and weight can be saved, in particular as the excess length does not require a wide support and can be accommodated by the inner eyes without any problems.

For reasons of simplified manufacture and assembly, it can be expedient if the eyes lying in the first plane and/or the eyes lying in the second plane are designed to be essentially the same.

An increased strength is achieved while requiring less material overall when two strengthening webs are provided, which connect the side surfaces of the plate-like outer section to the outer edge of the plate-like inner section.

The invention also provides a tire chain with a mesh having sliding and/or chain protection links covering the running surface of a tire, and with at least one side mesh, in which the side mesh is connected by means of a side tensioning strand with the help of a plurality of connecting and guide elements according to the invention or their variants, and an excess length of the tensioning strand can be accommodated in one of the eyes of the elements.

In this case, it is advantageous when the tensioning strand is in the form of a tensioning chain.

Furthermore, in order to simplify assembly, it is expedient when a welded chain link, which for its part is connected to the side mesh, is inserted in each of the eyes which lie in the second plane.

BRIEF DESCRIPTION OF THE DRAWINGS

The invention together with further advantages is described in more detail in the following with reference to exemplary embodiments, which are illustrated in the drawings. In the drawings.

DETAILED DESCRIPTION OF THE INVENTION

Figure 1:
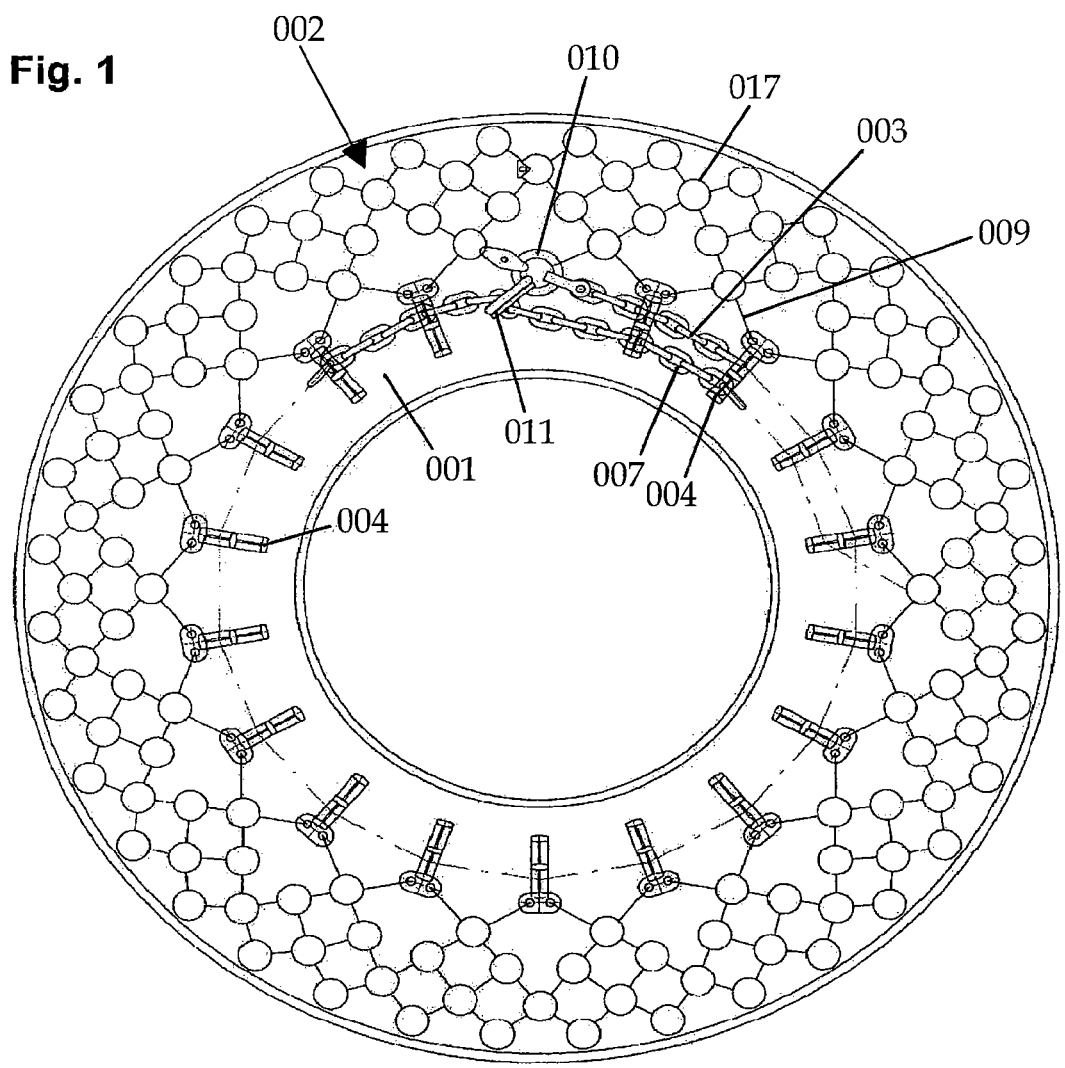
FIG. 1 shows a schematic side view of a tire chain according to an exemplary embodiment of the invention.

The side view according to FIG. 1 shows a vehicle tire 001, for example of a heavy vehicle, with a tire protecting chain 002 fitted to this tire. With such a tire chain, the side mesh 017 is tensioned and held on the tire with the help of a side tensioning strand, in the present case a tensioning chain 003. To connect the side mesh 017 to the tensioning strand 003, connecting and guide elements 004 are used, which on the one hand, and here reference is made to FIGS. 2 and 3, have eyes 005, 006 for accommodating the tensioning strand 003 and an excess length 007 of the tensioning strand, and on the other, have eyes 008 in which welded connecting links 009 are inserted, which serve to connect the element 004 to the side mesh 017.

It can be seen from FIG. 1 that the beginning of the tensioning chain is inserted in a ring 010, and then through eyes 005 (shown in detail in FIG. 2), which each lie radially towards the outside, of in this case a total of 17 elements 004, and, after tensioning, is fixed to a locking piece 011, which is inserted in the ring 010, the remaining untensioned excess length 007 of the tensioning chain 003 after this locking piece 011 being fed through further eyes 006, which lie further towards the inside, of several, in this case four, elements 004, the end of this tensioning chain finally being fixed to a link of the side chain.

Figure 2:
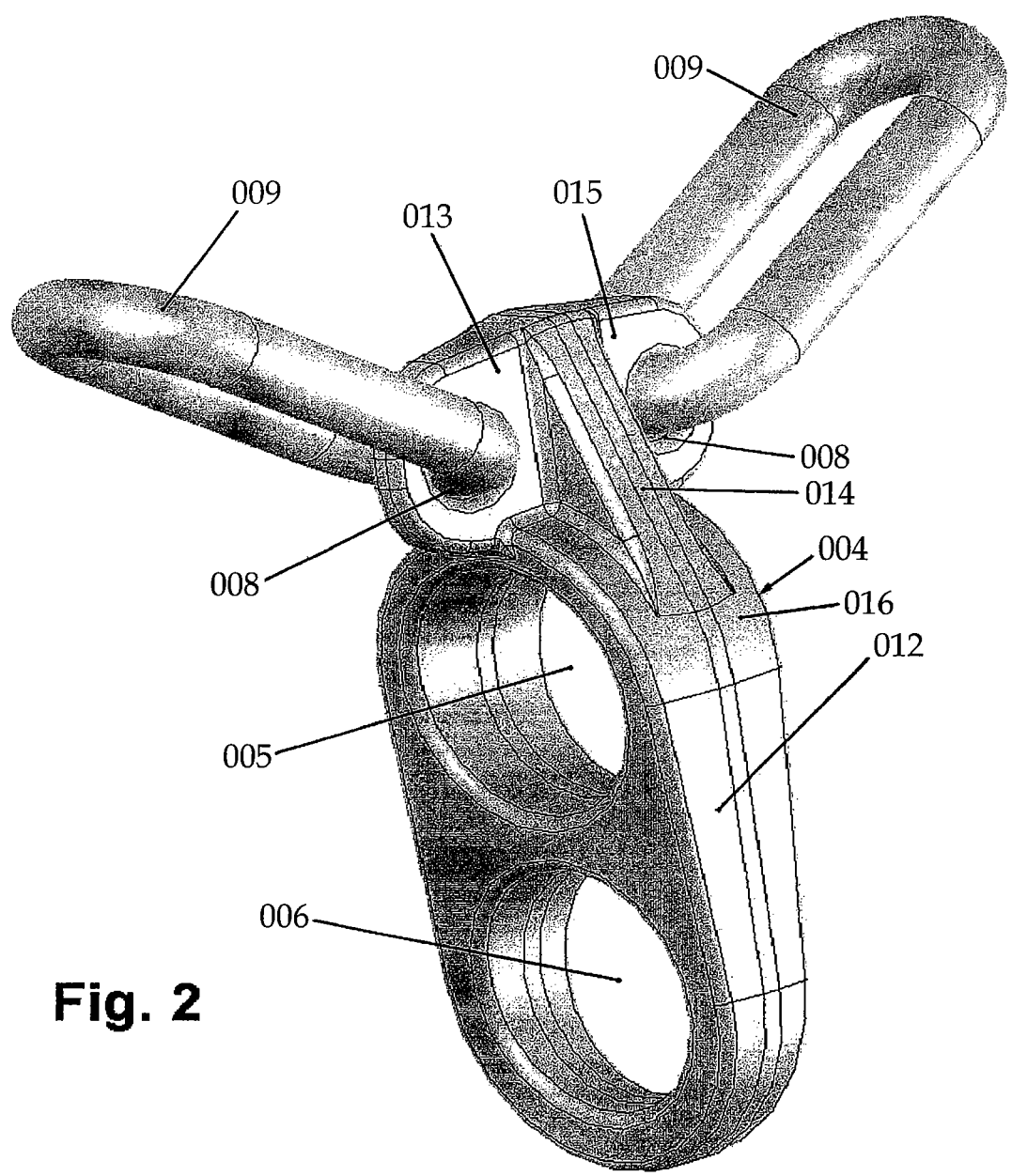
FIG. 2 shows a connecting and guide element according to an exemplary embodiment of the invention with two inserted chain links in a diagrammatic representation.

In particular, it can be seen from FIG. 2 that a connecting and guide element 004 has two plate-like sections 012, 013, namely a larger inner section 012 with the eyes 005, 006, which lie in a first plane 018, and a smaller outer section 013, which has the eyes 008, which lie in a second plane 019 running orthogonally to the first plane. The eyes 005, 006 and the eyes 008 are all designed to be essentially circular, the eyes of the larger inner section 012 having a larger diameter than the eyes 008 of the outer section 013. In the embodiment according to FIG. 2, the thickness of the plate-like inner section 012 reduces radially towards the inside. This enables weight to be saved, as the excess length 007 does not require as large a supporting surface as the tensioned part of the tensioning chain 003.

It can also be seen from FIG. 2 that the element 004 is provided with two reinforcing webs 014, of which however only the front-facing web 014 can be seen in the chosen view. These reinforcing webs connect the side surfaces 015 of the plate-like outer section 013 to the outer edge 016 of the plate-like inner section 012.

Figure 3:
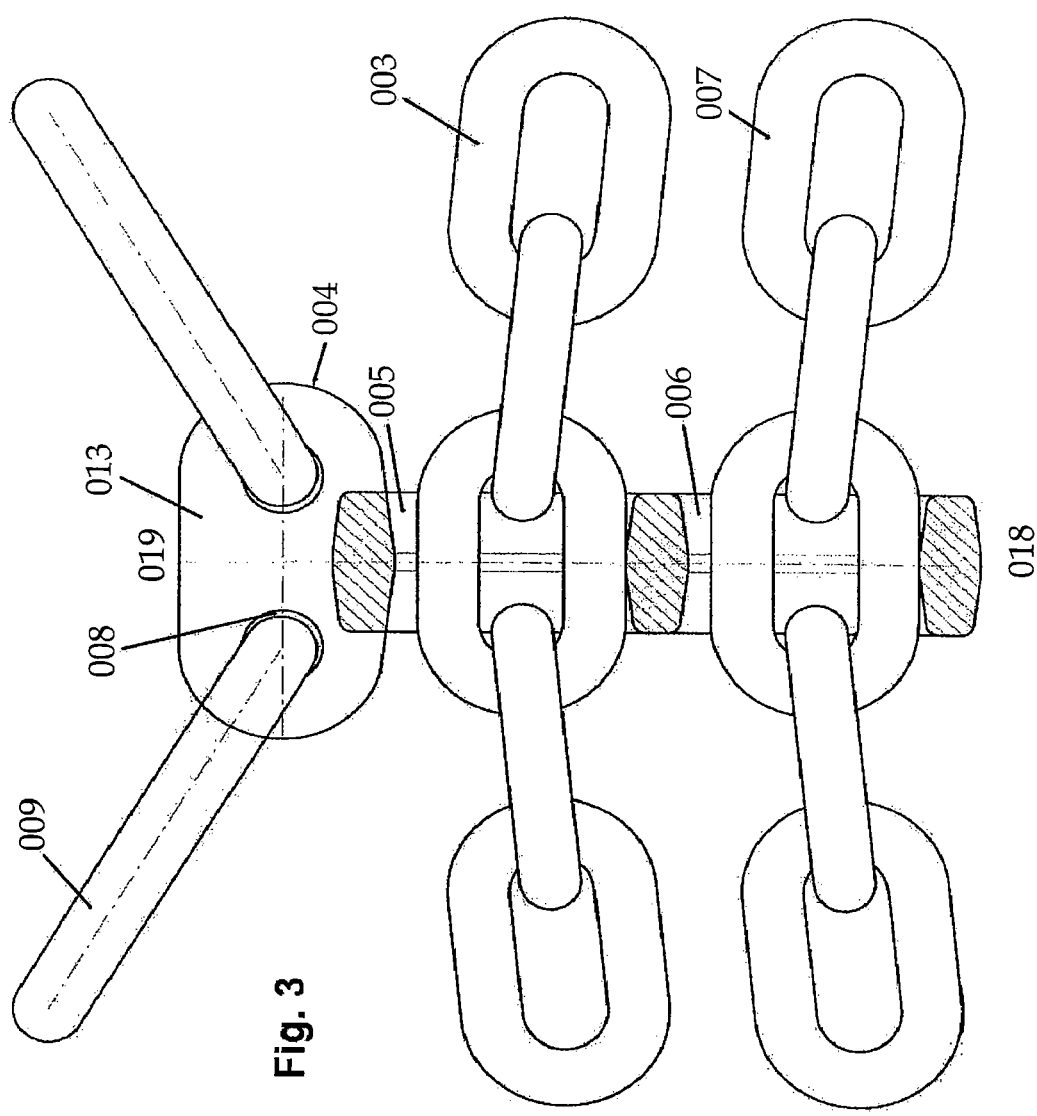
FIG. 3 shows the element shown in FIG. 2 in a sectional view perpendicular to a plane 018, additionally with a section of the tensioning chain and its excess length.

The guiding of the tensioning chain 003 and of the excess length 007 in the eye 005, which lies further towards the outside, and the eye 006, which lies further towards the inside, respectively, and also the accommodation of the welded connecting links 009 in the eyes 008 of the smaller outer section 013 of the element 004 can be clearly seen in FIG. 3.

Figure 4:
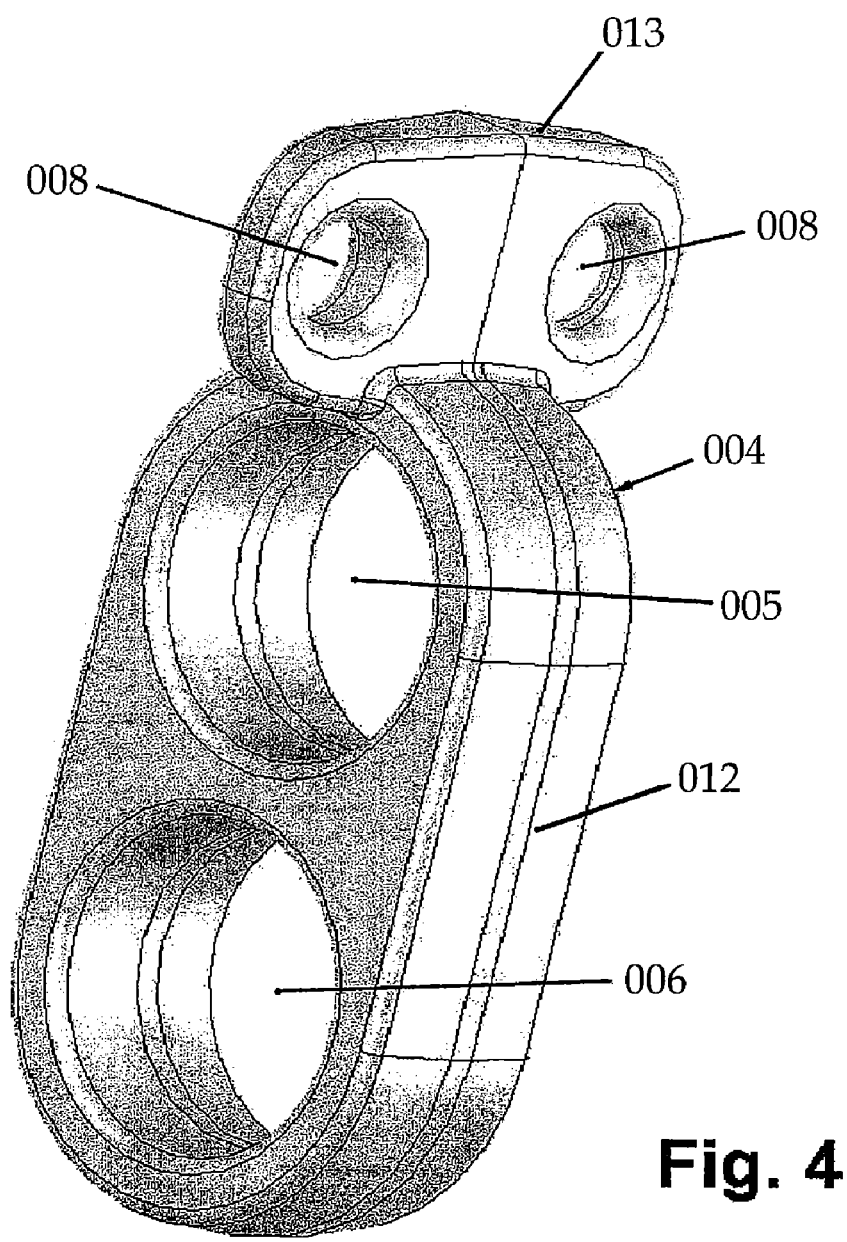
FIG. 4 shows an alternative embodiment of a connecting and guide element according to another exemplary embodiment of the invention in an illustration as in FIG. 2.

FIG. 4 shows a variant of a connecting and guide element 004, which is essentially the same as that shown and described above, but this variant differs from that of FIG. 2 in that no reinforcing webs are provided and that the thickness of the plate-like inner section 012 remains the same in the radial direction.

It is pointed out that other variants are possible within the framework of the protection sought in the patent claims. For example, the tensioning strand does not necessarily have to be in the form of a chain; it can also be a rope or an elastic rubber band etc. The connecting links, which are inserted in the outer eyes 008, can also have a form other than that which can be seen from FIG. 2 and FIG. 3.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A connecting and guide element for a tire chain for connecting a side mesh of the tire chain to a side tensioning strand and for accommodating an excess length of the tensioning strand, wherein the element comprises:
    at least two eyes for accommodating the tensioning strand, for accommodating the excess length, and for accommodating connecting links to the side mesh, wherein two of the at least two eyes for the tensioning strand and the excess length lie in a first plane; and two additional eyes lying in a second plane running essentially orthogonally to the first plane, wherein the two additional eyes are provided for accommodating the connecting links to the side mesh; and
    two plate-like sections, including a larger first section with the at least two eyes lying in the first plane, and a smaller second section with the two additional eyes lying in the second plane, wherein the first section is located radially towards a center of the tire on which the chain is mounted and has a thickness reducing towards an end oriented toward the center of the tire.

2. The connecting and guide element according to claim 1, wherein the at least two eyes lying in the first plane are substantially circular.

3. The connecting and guide element according to claim 1, wherein the additional eyes lying in the second plane are substantially circular.

4. The connecting and guide element according to claim 3, wherein the at least two eyes lying in the first plane are substantially identical.

5. The connecting and guide element according to claim 1, wherein the additional eyes lying in the second plane are substantially identical.

6. The connecting and guide element according to claim 1, further comprising two strengthening webs connecting the side surfaces of the outer section to an outer edge of the inner section.

7. A tire chain assembly comprising:
    a plurality of connecting and guide elements for a tire chain for connecting a side mesh of the tire chain to a side tensioning strand and for accommodating an excess length of the tensioning strand, wherein each of the plurality of connecting and guide elements comprises:
    at least two eyes for accommodating the tensioning strand, for accommodating the excess length, and for accommodating connecting links to the side mesh, wherein two of the at least two eyes for the tensioning strand and the excess length lie in a first plane; and two additional eyes lying in a second plane running essentially orthogonally to the first plane, wherein the two additional eyes are provided for accommodating the connecting links to the side mesh; and
    a tire chain with a mesh having sliding and/or chain protection links extending over a running surface of a tire, and with at least one side mesh extending from the mesh, in which the side mesh is held on the tire by a tensioning strand and a plurality of the connecting and guide elements,
    wherein an excess length of the tensioning strand is able to be accommodated in one of the at least two eyes of at least one of the plurality of connecting and guide elements.

8. The assembly according to claim 7, wherein the tensioning strand passes through an eye of the two eyes, which lies radially further to the outside of the tire, and the excess length is accommodated in those of these eyes, which lie radially further to the inside.

9. The assembly according to claim 7, wherein the tensioning strand is in the form of a tensioning chain.

10. The assembly according to claim 7, further comprising a chain link connected to the side mesh, wherein the chain link is inserted in each of the additional eyes which lie in the second plane.

11. A connecting and guide element for a tire chain for connecting a side mesh of the tire chain to a side tensioning strand and for accommodating an excess length of the tensioning strand, wherein the element comprises:
    at least two eyes for accommodating the tensioning strand, for accommodating the excess length, and for accommodating connecting links to the side mesh, wherein two of the at least two eyes for the tensioning strand and the excess length lie in a first plane; and two additional eyes lying in a second plane running essentially orthogonally to the first plane, wherein the two additional eyes are provided for accommodating the connecting links to the side mesh;

two plate-like sections, including a larger first section with the at least two eyes lying in the first plane, and a smaller second section with the two additional eyes lying in the second plane, wherein the first section is located radially towards a center of the tire on which the chain is mounted and has a thickness reducing towards an end oriented toward the center of the tire; and two strengthening webs connecting the side surfaces of the second section to an outer edge of the first section.

* * * * *